United States Patent
Ida et al.

[11] Patent Number: 5,981,638
[45] Date of Patent: Nov. 9, 1999

[54] THERMOPLASTIC RESIN COMPOSITION

[75] Inventors: Kanako Ida, Ashiya; Shinichi Yachigo, Toyonaka, both of Japan

[73] Assignee: Sumitomo Chemical Company, Limited, Osaka, Japan

[21] Appl. No.: 08/111,905

[22] Filed: Aug. 26, 1993

[30] Foreign Application Priority Data

Aug. 28, 1992 [JP] Japan ................................. 4-229703

[51] Int. Cl.⁶ ............................. C08K 5/10; C08L 51/04; C08F 279/04
[52] U.S. Cl. ..................... 524/291; 525/309; 525/310; 525/303; 524/565
[58] Field of Search ................................. 525/303, 309, 525/310, 479; 524/291, 565, 571, 588

[56] References Cited

U.S. PATENT DOCUMENTS

| | | |
|---|---|---|
| 3,953,402 | 4/1976 | Kline . |
| 4,168,387 | 9/1979 | Cottman . |
| 4,525,514 | 6/1985 | Yachigo et al. . |
| 5,128,398 | 7/1992 | Sasaki et al. . |
| 5,250,593 | 10/1993 | Ishii et al. ................................. 524/100 |
| 5,281,646 | 1/1994 | Yachigo et al. ........................ 524/291 |
| 5,300,568 | 4/1994 | Abe et al. . |
| 5,428,091 | 6/1995 | Abe et al. . |
| 5,668,247 | 9/1997 | Furutami et al. . |

FOREIGN PATENT DOCUMENTS

| | | |
|---|---|---|
| 0322166 | 6/1989 | European Pat. Off. . |
| 2302470 | 12/1990 | Japan . |

*Primary Examiner*—Vasu Jagannathan
*Attorney, Agent, or Firm*—Stevens, Davis, Miller & Mosher, L.L.P.

[57] ABSTRACT

In order to prevent a thermoplastic resin possessing an unsaturated nitrile unit from discoloration, the thermoplastic resin prepared by copolymerizing at least an unsaturated nitrile compound as a polymerizing component in the presence or absence of a rubbery polymer is blended with 2,4-di-t-amyl-6-[1-(3,5-di-t-amyl-2-hydroxyphenyl)ethyl] phenyl acrylate. The resulting composition shows little discoloration during the production and processing stages.

6 Claims, No Drawings

THERMOPLASTIC RESIN COMPOSITION

The present invention relates to a composition of a thermoplastic resin possessing a structural unit derived from an unsaturated nitrile compound, which unit will sometimes be referred to hereunder as an "unsaturated nitrile unit" for brevity. More particularly, the invention is directed to the composition which is hardly discolored during the production or processing stage of such thermoplastic resin.

As thermoplastic resins possessing a structural unit derived from an unsaturated nitrile compound, there are known the so-called ABS resins which are obtained by graft-polymerizing an unsaturated nitrile compound and an aromatic vinyl compound onto a rubbery polymer; the so-called AS resins which are copolymers of an aromatic vinyl compound and an unsaturated nitrile compound; and high nitrile resins which are obtained by polymerizing an unsaturated nitrile compound as a main polymerizing component in the presence of a rubbery polymer and have a content of a repeating unit derived from the unsaturated nitrile compound of 50% by weight or more.

ABS resins, which are frequently used blended with an AS resin or the like, are widely used in automobile industries and other vast variety of fields by virtue of their good processability and mechanical strength. High nitrile resins, on the other hand, are used for containers for liquids or solids, food packaging materials and the like by virtue of their high chemical resistance, impact resistance and gas barrier properties.

These resins all have a problem of undergoing serious discoloration during the production or processing stage owing to the presence of the unsaturated nitrile units in the resins. In order to stabilize these resins during the production or processing stage, there has heretofore been used a method comprising incorporating various phenolic antioxidants into the resins or a method comprising incorporating such a phenolic antioxidant and at least one of sulfur-containing antioxidants, phosphorous-containing antioxidants and amine antioxidants in combination into the resins.

The phenolic antioxidants now in use include n-octadecyl 3-(3,5-di-t-butyl-4-hydroxyphenyl)-propionate, 4,4'-butylidenebis(3-methyl-6-t-butylphenol), 4,4'-thiobis (3-methyl-6-t-butylphenol), 2,2'-methylenebis(4-methyl-6-t-butylphenol) and 2,6-di-t-butyl-4-methylphenol.

The sulfur-containing antioxidants now in use include pentaerythrityl tetrakis(3-laurylthiopropionate), dilauryl 3,3'-thiodipropionate, dimyristyl 3,3'-thiodipropionate and distearyl 3,3'-thiodipropionate.

The phosphorous-containing antioxidants now in use include tris(nonylphenyl) phosphite.

The discoloration of the thermoplastic resins mentioned above during the production or processing stage can be considerably prevented by using the antioxidants. However, to the resins having a relatively high content of the unsaturated nitrile unit, the discoloration cannot be satisfactorily prevented by the use of the antioxidants. Moreover, recent extension of the application of these resins into the automobile industries requires further improvement of the chemical resistance of the resins by increasing the content of the unsaturated nitrile unit in the resins. Therefore, the resins having a high content of the unsaturated nitrile unit as well as an improved resistance to discoloration have been eagerly awaited.

It is an object of the present invention to provide a thermoplastic resin composition which shows little discoloration during the production and processing stages of the resin, even when the resin contains a relatively large amount of a repeating unit derived from an unsaturated nitrile compound.

As a result of intensive research to achieve the object, the present invention has been accomplished.

Thus, the invention provides a thermoplastic resin composition comprising a resin prepared by copolymerizing at least an unsaturated nitrile compound as a polymerizing component in the presence or absence of a rubbery polymer, and 2,4-di-t-amyl-6-[1-(3,5-di-t-amyl-2-hydroxyphenyl) ethyl]phenyl acrylate.

The resin to be used in the invention is obtained by copolymerizing at least an unsaturated nitrile compound as a polymerizing component in the presence or absence of a rubbery polymer. Specific examples of the rubbery polymer usable for the production of the resin are diene rubbers such as polybutadiene, styrene/butadiene rubber, styrene/butadiene block copolymer, butadiene/acrylonitrile copolymer, polyisoprene and polychloroprene, saturated rubbers such as acrylic rubber, ethylene/propylene copolymer rubber, hydrogenated polybutadiene, fluorinated rubber and silicone rubber, and the like. The unsaturated nitrile compound to be polymerized in the presence or absence of such a rubbery polymer includes, for example, acrylonitrile, methacrylo-nitrile, α-chloroacrylonitrile, and the like. When an unsaturated nitrile compound alone is used as a monomer for producing the resin, it is polymerized in the presence of the rubbery polymer.

Other than the unsaturated nitrile compound, an unsaturated compound copolymerizable with the unsaturated nitrile compound can be used for producing the resin to be used in the present invention as an additional polymerizing component. Such an unsaturated compound includes aromatic vinyl compounds, (meth)-acrylic acid lower alkyl esters, and the like.

The aromatic vinyl compound to be used herein includes, for example, styrene, nuclear substituted alkyl styrenes such as p-methylstyrene and p-tert-butylstyrene, α-substituted styrenes such as α-methyl-styrene, and the like. A part of the aromatic vinyl compound can be replaced by another unsaturated compound such as an unsaturated carboxylic acid alkyl ester or an imide compound. The unsaturated carboxylic acid alkyl ester includes, for example, methyl acrylate, ethyl acrylate, methyl methacrylate, glycidyl methacrylate, and the like. The imide compound includes, for example, maleimide, N-phenylmaleimide, and the like.

The (meth)acrylic acid lower alkyl ester, which can be another polymerizing component in addition to the unsaturated nitrile compound, includes, for example, methyl acrylate, ethyl acrylate, methyl methacrylate, ethyl methacrylate, and the like.

Polymerization of an unsaturated nitrile compound in the presence of a rubbery polymer or polymerization of an unsaturated nitrile compound and an unsaturated compound (e.g. the above-exemplified aromatic vinyl compounds and (meth)acrylic acid lower alkyl esters) copolymerizable with the unsaturated nitrile compound in the presence or absence of a rubbery polymer can be carried out by ordinary polymerizing methods conventionally known, including emulsion polymerization, solution polymerization, bulk polymerization, suspension polymerization, bulk suspension polymerization, and the like. In the polymerization, known emulsifier, initiator, molecular weight controller, and the like can be used.

Of the thermoplastic resins possessing an unsaturated nitrile unit thus obtained, those to be preferably applied in the invention are high nitrile resins containing 50% by weight or more of the unsaturated nitrile unit and prepared by polymerizing the unsaturated nitrile compound in the presence of the rubbery polymer or by polymerizing the unsaturated nitrile compound and the (meth)acrylic acid lower alkyl ester in the presence of the rubbery polymer; and the so-called AS resins obtained by copolymerizing the unsaturated nitrile compound and the aromatic vinyl compound in the absence of the rubbery polymer.

The thermoplastic resin to be used in the invention can also be a mixture of two or more polymers, if necessary. The polymers which can be mixed with the above-exemplified polymers include, for example, polycarbonate, polyamide, poly(phenylene ether), polyester, poly(vinyl chloride), and the like.

In the invention, the thermoplastic resin possessing an unsaturated nitrile unit is blended with 2,4-di-t-amyl-6-[1-(3,5-di-t-amyl-2-hydroxyphenyl)ethyl] phenyl acrylate, which will sometimes be referred to hereunder as a "phenyl acrylate" for brevity. The phenyl acrylate is used preferably in a range of from 0.01 to 3 parts by weight per 100 parts by weight of the thermoplastic resin. The amount of the phenyl acrylate less than 0.01 part by weight is sometimes insufficient for the effect to prevent the base resin from discoloration, and the amount exceeding 3 parts by weight sometimes does not give proper improvements enough for the increased amount and is uneconomical.

Timing to add the phenyl acrylate is not particularly limited, and the phenyl acrylate can be added at any stage to prepare and process the thermoplastic resin. For example, it may be added at the polymerization step, flocculation step, pelletization step, or the like. At the blending, known apparatuses and operation manners can be applied almost exactly as they are. For example, when the phenyl acrylate is added at the production stage of the polymer, a solution, suspension or emulsion of the phenyl acrylate may be added to a solution, suspension or emulsion of the polymer. When the phenyl acrylate is added at the processing stage of the polymer, dry blending may be applied.

In the present invention, the thermoplastic resin may be additionally blended, if necessary and desired, with additives other than the phenyl acrylate, for example, phenolic antioxidants other than the phenyl acrylate, sulfur-containing antioxidants, phosphorus-containing antioxidants, ultraviolet absorbers, hindered amine light stabilizers, lubricants, pigments, dyes, flame retardants, forming agents, reinforcing materials, and inorganic fillers. Specific examples of these optionally usable additives are enumerated below.

Specific examples of the phenolic antioxidant other than the phenyl acrylate are as follows:
4,4'-butylidenebis(3-methyl-6-t-butylphenol),
2,2'-methylenebis(4-methyl-6-t-butylphenol),
4,4'-thiobis(3-methyl-6-t-butylphenol),
n-octadecyl 3-(3,5-di-t-butyl-4-hydroxy-phenyl)propionate,
2-t-butyl-6-(3-t-butyl-5-methyl-2-hydroxy-benzyl)-4-methylphenyl acrylate,
pentaerythrityl tetrakis[3-(3,5-di-t-butyl-4-hydroxyphenyl) propionate],
triethylene glycol bis[3-(3-t-butyl-4-hydroxy-5-methylphenyl)propionate],
3,9-bis[2-{3-(3-t-butyl-4-hydroxy-5-methylphenyl) propionyloxy}-1,1-dimethylethyl]-2,4,8,10-tetraoxaspiro [5.5]undecane,
2,2'-ethylidenebis(4,6-di-t-butylphenol),
tris(3,5-di-t-butyl-4-hydroxybenzyl) isocyanurate, and
2,6-di-t-butyl-4-methylphenol.

Specific examples of the sulfur-containing antioxidant are as follows:
pentaerythrityl tetrakis(3-lauryl-thiopropionate),
dilauryl 3,3'-thiodipropionate,
dimyristyl 3,3'-thiodipropionate,
distearyl 3,3'-thiodipropionate, and lauryl stearyl 3,3'-thiodipropionate.

Specific examples of the phorphorus-containing antioxidant are as follows:
tris(nonylphenyl) phosphite,
distearyl pentaerythritol diphosphite,
tris(2,4-di-t-butylphenyl) phosphite,
tetratridecyl 4,4'-butylidenebis(3-methyl-6-t-butylphenyl) diphosphite,
bis(2,4-di-t-butylphenyl) pentaerythritol diphosphite,
tetrakis(2,4-di-t-butylphenyl) 4,4'-biphenylene diphosphonite,
bis(2,6-di-t-butyl-4-methylphenyl) pentaerythritol diphosphite,
2,2'-methylenebis(4,6-di-t-butylphenyl) octyl phosphite,
2,2'-ethylidenebis(4,6-di-t-butylphenyl) fluorophosphonite, and
bis(2,4,6-tri-t-butylphenyl) pentaerythritol diphosphite.

Specific examples of the ultraviolet absorber are as follows:
2-hydroxy-4-methoxybenzophenone,
2-hydroxy-4-octyloxybenzophenone,
2,2'-dihydroxy-4-methoxybenzophenone,
bis(5-benzoyl-4-hydroxy-2-methoxyphenyl)-methane,
2,2',4,4'-tetrahydroxybenzophenone,
2-(2-hydroxy-5-methylphenyl)benzotriazole,
2-[2-hydroxy-3-(3,4,5,6-tetrahydro-halimidomethyl)-5-methylphenyl]benzotriazole,
2-(3-t-butyl-2-hydroxy-5-methylphenyl)-5-chlorobenzotriazole,
2-(3,5-di-t-butyl-2-hydroxyphenyl)benzotriazole,
2-(2-hydroxy-5-t-octylphenyl)benzotriazole,
2-(3,5-di-t-amyl-2-hydroxyphenyl)benzoriazole,
2-[2-hydroxy-3,5-bis($\alpha,\alpha$-dimethylbenzyl)-phenyl]-2H-benzotriazole,
2-(3,5-di-t-butyl-2-hydroxyphenyl)-5-chlorobenzotriazole,
2,2'-methylenebis[6-(2H-benzotriazol-2-yl)-4-(1,1,3,3-tetramethylbutyl)phenol],
condensation product of polyethylene glycol of 3–11 ethylene glycol units with methyl 3-[3-(2H-benzotriazol-2-yl)-5-t-butyl-4-hydroxyphenyl]propionate,
2-ethylhexyl 3-[3-t-butyl-5-(5-chloro-2H-benzotriazol-2-yl)-4-hydroxyphenyl]propionate,
octyl 3-[3-t-butyl-5-(5-chloro-2H-benzotriazol-2-yl)-4-hydroxyphenyl]propionate,
methyl 3-[3-t-butyl-5-(5-chloro-2H-benzotriazol-2-yl)-4-hydroxyphenyl]propionate,
3-[3-t-butyl-5-(5-chloro-2H-benzotriazol-2 -yl)-4-hydroxyphenyl]propionic acid, and
2,2'-methylenebis[4-t-butyl-6-(2H-benzotriazol-2-yl) phenol].

Specific examples of the hindered amine light stabilizer are as follows:
bis(2,2,6,6-tetramethyl-4-piperidyl) sebacate,
polycondensation product of dimethyl succinate with 1-(2-hydroxyethyl)-4-hydroxy-2,2,6,6-tetramethylpiperidine,
poly[(6-morpholino-1,3,5-triazin-2,4-diyl)-{(2,2,6,6-tetramethyl-4-piperidyl)imino}hexamethylene-{(2,2,6,6-tetramethyl-4-piperidyl)imino}],
bis(1,2,2,6,6-pentamethyl-4-piperidyl) 2-(3,5-di-t-butyl-4-hydroxybenzyl)-2-butylmalonate,
4-[3-(3,5-di-t-butyl-4-hydroxyphenyl)-propionyloxy]-1-[2-{3-(3,5-di-t-butyl-4-hydroxyphenyl)-propionyloxy}ethyl]-2,2,6,6-tetramethylpiperidine,
bis(1,2,2,6,6-pentamethyl-4-piperidyl) decanedioate,
tetrakis(2,2,6,6-tetramethyl-4-piperidyl) 1,2,3,4-butanetetracarboxylate, poly[{6-(1,1,3,3-tetramethylbutyl)imino-1,3,5-triazin-2,4-diyl} {(2,2,6,6-tetramethyl-4-piperidyl)-imino}hexamethylene{(2,2,6,6-tetramethyl-4-piperidyl)-imino}], mixed esterification product of 1,2,3,4-butanetetracarboxylic acid with 1,2,2,6,6-pentamethyl-4-piperidinol and 1-tridecanol, mixed esterification product of 1,2,3,4-butanetetracarboxylic acid with 2,2,6,6-tetramethyl-4-piperidinol and 1-tridecanol, mixed esterification product of 1,2,3,4-butanetetracarboxylic acid with 1,2,2,6,6-pentamethyl-4-piperidinol and 3,9-bis(2-hydroxy-1,1-dimethylethyl)-2,4,8,10-tetraoxaspiro[5.5]undecane, mixed esterification product of 1,2,3,4-butanetetracarboxylic acid with 2,2,6,6-tetramethyl-4-piperidinol and 3,9-bis(2-hydroxy-1,1-dimethylethyl)-2,4,8,10-tetraoxaspiro[5.5]undecane, polycondensation product of N,N'-bis(2,2,6,6-tetramethyl-4-piperidyl)hexamethylenediamine with 1,2-dibromoethane, 2-methyl-2-(2,2,6,6-tetramethyl-4-piperidyl)amino-N-(2,2,6,6-tetramethyl-4-piperidyl)propionamide, N,N',4,7-tetrakis[4,6-bis{N-butyl-N-(2,2,6,6-tetramethyl-4-piperidyl)amino}-1,3,5-triazin-2-yl]-4,7- diazadecane-1,10-diamine, N,N',4-tris[4,6-bis{N-butyl-N-(2,2,6,6-tetramethyl-4-piperidyl)amino}-1,3,5-triazin-2-yl]-4,7-diazadecane-1,10-diamine, bis(1-acryloyl-2,2,6,6-tetramethyl-4-piperidyl) 2,2-bis(3,5-di-t-butyl-4-hydroxybenzyl)-malonate, N,N',4,7-tetrakis[4,6-bis{N-butyl-N-(1,2,2,6,6-pentamethyl-4-piperidyl)amino}-1,3,5 -triazin-2-yl]-4,7-diazadecane-1,10-diamine, N,N',4-tris[4,6-bis{N-butyl-N-(1,2,2,6,6-pentamethyl-4-piperidyl)amino}-1,3,5-triazin-2-yl]-4,7-diazadecane-1,10-diamine, bis(2,2,6,6-tetramethyl-4-piperidyl) succinate, 2,2,6,6-tetramethyl-4-piperidyl methacrylate, 1,2,2,6,6-pentamethyl-4-piperidyl methacrylate, and tetrakis(1,2,2,6,6-pentamethyl-4-piperidyl) 1,2,3,4-butanetetracarboxylate.

The present invention is described in more detail below with reference to Examples. These Examples are merely for the sake of illustrating preferred embodiments and are not to be construed as limiting the scope of the present invention. In the Examples, parts are by weight unless otherwise stated.

EXAMPLE 1

A high nitrile resin prepared by graft-polymerizing a mixture of acrylonitrile and methyl acrylate onto a butadiene-acrylonitrile copolymer rubber was used as the resin for thermoplastic resin composition. The high nitrile resin contained about 75% by weight of a repeating unit derived from acrylonitrile.

The following stabilizers were used in the test.

Compound I: 2,4-di-t-amyl-6-[1-(3,5-di-t-amyl-2-hydroxyphenyl)ethyl]phenyl acrylate AO-1: 2-t-butyl-6-(3-t-butyl-2-hydroxy-5-methylbenzyl)-4-methylphenyl acrylate 100 Parts of the above-mentioned high nitrile resin was dry-blended with each of the stabilizers in an amount shown in Table 1. The resulting blends were melt-kneaded at 165° C. with a single screw extruder of 30 mm bore diameter and pelletized. The yellowness index (abbreviated as YI) of the pellet obtained was determined for evaluation of degree of discoloration.

Table 1 shows the results. The smaller the YI value, the less serious the discoloration in the processing stage.

TABLE 1

|  |  | Example of the present invention | Control | |
| --- | --- | --- | --- | --- |
| Run No. |  | 1 | 2 | 3 |
| Stabilizer (part) | Compound I | 0.3 | None | |
|  | AO-1 |  |  | 0.3 |
| Hue (YI) |  | −30.5 | −5.2 | −16.7 |

EXAMPLE 2

An acrylonitrile-styrene copolymer prepared without using a rubbery polymer was used as the resin for thermoplastic resin composition. The acrylonitrile-styrene copolymer contained about 30% by weight of a repeating unit derived from acrylonitrile. The following compounds were used as the stabilizer.

Compound I: 2,4-di-t-amyl-6-[1-(3,5-di-t-amyl-2-hydroxyphenyl)ethyl]phenyl acrylate AO-1: 2-t-butyl-6-(3-t-butyl-2-hydroxy-5-methylbenzyl)-4-methylphenyl acrylate AO-2: n-octadecyl 3-(3,5-di-t-butyl-4-hydroxyphenyl) propionate 100 Parts of the above-mentioned acrylonitrile-styrene copolymer was dry-blended with each of the stabilizers in an amount shown in Table 2. The resulting blends were melt-keaded at 165° C. with a single screw extruder of 30 mm bore diameter and pelletized. The pellets thus obtained were allowed to stay in a 5.5-ounce injection machine at 260° C. for 30 minutes and then molded into a sheet with a size of 60 mm by 40 mm. The YI of the sheet was determined for evaluation of degree of discoloration. Table 2 shows the results. The smaller the YI value, the less serious the discoloration in the processing stage.

TABLE 2

|  |  | Example of the present invention | Control | | |
| --- | --- | --- | --- | --- | --- |
| Run No. |  | 4 | 5 | 6 | 7 |
| Stabilizer (part) | Compound I | 0.3 | None | | |
|  | AO-1 |  |  | 0.3 | |
|  | AO-2 |  |  |  | 0.3 |
| Hue (YI) |  | 2.3 | 16.2 | 24.7 | 20.4 |

According to the present invention, the discoloration of thermoplastic resins possessing an unsaturated nitrile unit during the production and processing stages can be markedly reduced.

What is claimed is:

1. A thermoplastic resin composition comprising
   (a) a resin prepared by copolymerizing at least an unsaturated nitrile compound as a polymerizing component in the presence of a rubber polymer and containing at least 50% by weight of a structural unit derived from the unsaturated nitrile compound, or a resin prepared by copolymerizing at least an unsaturated nitrile compound as a polymerizing component in the absence of a rubber polymer, and (b) 2,4-di-t-amyl-6-[1-(3,5-di-t-amyl-2-hydroxyphenyl) ethyl]phenyl acrylate.

2. A composition according to claim 1, wherein the resin is prepared by polymerizing the unsaturated nitrile compound in the presence of the rubber polymer.

3. A composition according to claim 1, wherein the resin is prepared by polymerizing the unsaturated nitrile compound and a (meth)acrylic acid lower alkyl ester in the presence of the rubber polymer.

4. A composition according to claim 1, wherein the resin is prepared by copolymerizing the unsaturated nitrile compound and an aromatic vinyl compound in the absence of the rubber polymer.

5. A composition according to claim 1, wherein the unsaturated nitrile compound is selected from the group consisting of acrylonitrile, methacrylonitrile and α-chloroacrylonitrile.

6. A composition according to claim 1, which contains 2,4-di-t-amyl-6-[1-(3,5-di-t-amyl-2-hydroxyphenyl)ethyl] phenyl acrylate in an amount of from 0.01 to 3 parts by weight per 100 parts by weight of the resin.

* * * * *